March 1, 1960     A. J. GOTTMAN     2,926,454
FISH HOOK CONSTRUCTION
Filed June 8, 1956
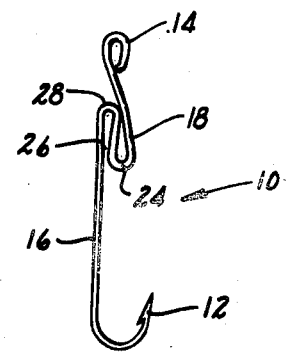
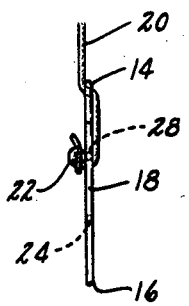
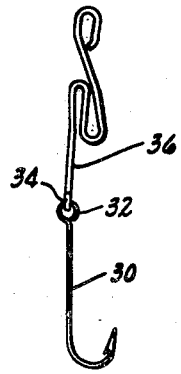
INVENTOR
ALFRED J. GOTTMAN
BY
SMITH, OLSEN, LEWIS & McRAE
ATTORNEYS United States Patent Office 2,926,454
Patented Mar. 1, 1960

2,926,454
FISH HOOK CONSTRUCTION
Alfred Joseph Gottman, Fenton, Mich.
Application June 8, 1956, Serial No. 590,241
4 Claims. (Cl. 43—44.83)

The present invention relates to fishing equipment, and more particularly to an improvement for attaching a fishing hook to a line. The invention is especially useful in wintertime when fishing through the ice, but it will be understood that the invention is not limited to such use and may be used in connection with all fishing operations where a fishing hook is attached to a line.

It is common practice when fishing through the ice to employ a fly or a hook having a small feather concealing the hook and to have the end of the hook baited. On occasions the fisherman may desire to change the so-called fly. This is not always easy to do because of the weather conditions which make it difficult to unfasten one hook from the line and refasten another hook.

It is an object of the present invention to provide a unique means for attaching a fishing hook to a line, the means being characterized by the extreme simplicity involved in attaching and detaching the hook and line so that such operation can be performed in cold weather and, if desired, while wearing mittens or gloves.

It is another object of the present invention to provide a hook and line attaching means of the foregoing character which is constructed and arranged so that the hook cannot be readily detached by a fish that may have taken the bait.

It is still another object of the present invention to provide a fishing hook having an attaching means of the foregoing character formed as an integral part of the stem of the hook.

It is still another object of the present invention to provide an attachment for a conventional type fishing hook, said attachment being constructed and arranged so that it has the same unique means characterized above for fastening to or detaching from the end of a fishing line.

It is still another object of the present invention to provide a means for attachment of a fishing hook to a fishing line, said means being characterized by its effective operation and its simplicity and low cost to manufacture.

Other objects of this invention will appear in the following description and appended claims, reference being had to the accompanying drawings forming a part of this specification wherein like reference characters designate corresponding parts in the several views.

In the drawings:

Figure 1 is a side elevation of a fishing hook embodying one form of the invention;

Figure 2 is a fragmentary front elevation of the attaching means shown in the embodiments of Figure 1 and illustrates the end of a fishing line retained by the attaching means; and Figure 3 is a side elevation of a fishing hook with an attachment embodying another form of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The fishing hook 10 illustrated in Figures 1 and 2 has a conventional barbed end 12 and an eye 14 at the upper end of the stem 16. The upper end of stem 16, adjacent the eye 14 has an S-shaped or double reversed segment 18 which serves as a means of attachment to a fishing line.

As can be seen best in Figure 2, the S-shaped or double reversed segment 18 lies in one plane common with the plane of the eye 14. When it is desired to attach the hook 10 to the end of fishing line 20, it is only necessary to tie a knot 22 in the end of line 20. Thereafter, the knot 22 is passed through eye 14 and pulled down to a position below the lower portion 24 in the S-shaped or double reversed segment 18. The line 20, above knot 22, is then passed into the narrow slot 26 and the other end of line 20 is pulled causing the knot 22 to be drawn up to the upper end 28 of the S-shaped or double reversed segment 18. Since knot 22 is larger than the width of slot 26, it will not be pulled therethrough.

As can be seen in Figure 1, the lower end of slot 26 is nearly closed which prevents the line 20 from falling out of such slot should the line become slack. However, the line 20 can be introduced into the slot 26 merely by keeping the line 20 taut while pulling it into the slot 26. By virtue of the resilient properties of the stem 16 the slot will open enough to allow line 20 to pass thereinto.

Likewise, when it is desired to detach the hook 10 from the line 20, the latter can be pulled from the slot 26 by first pulling additional line through the eye 14 and S-shaped segment 18, and thereafter, slipping the line 20 through the open end of slot 26. The stem 16 will again spread apart by virtue of its resilient properties.

By virtue of the novel S-shaped or double reversed segment 18, the line 20 can quite readily be attached to or detached from the fishing hook 10. If desired, the line 20 can be a nylon leader or any other conventional type of fishing line. Normally, when using the present invention, the line 20 will remain knotted at its end as illustrated in the drawing. The fisherman can then interchange the fly or other artificial bait with no difficulty irrespective of weather conditions or any other conditions which might make such operation difficult.

Figure 3 shows a modified form of the invention where the attaching means is made separate from a conventional fishing hook 30. The latter has an eye 32 at its upper end to which the lower end 34 of the attachment 36 is attached, as by means of another eye. These attached parts normally will be joined prior to departing on the fishing expedition and the attachment will then be of a permanent nature. This modification is intended primarily to be used with conventional fishing hooks now in use so as not to render such hooks obsolete. In other respects the attachment 36 has the same shape and configuration as the upper end of hook 10, and a line can be secured to attachment 36 in the same manner as was described with respect to hook 10.

Having thus described my invention, I claim:

1. A fishing hook for attachment to a fishing line having a knotted end, said hook having a stem with an eye at its upper end, the upper portion of the stem below said eye having a double reverse bend with one of said bends opening downwardly and being substantially closed at its lower end, the segments of said stem portion forming the opening in the last-named reverse bend converging together toward said lower end to form a restricted passageway therebetween tending to prevent passage of said fishing line therethrough, the opening in the eye having a larger radius than the opening in the last named bend so that the knotted end can pass through said eye but not through said bend.

2. A fishing hook for attachment to a fishing line having a knotted end, said hook having a stem with an eye at its upper end, the upper portion of the stem below said eye having a double reverse bend in a common plane with said eye, one of said bends having its opposite sides extending downwardly and converging together to form a downwardly directed opening of relatively narrow width with a restricted passageway at its bottom and said eye having a relatively wider opening so that said knotted end can pass through said eye but not through the opening in said one bend.

3. A fishing hook for attachment to a fishing line having a knotted end, said hook having an eye at its upper end through which said knotted end can pass, the upper portion of the stem of the hook having reverse bent generally parallel downwardly directed portions forming a slot opening downwardly and being of less width than the width of said eye so that the knotted end will pass through said eye but not through said slot, said downwardly directed portions converging together to form a restricted passageway to impede passage of said fishing line therethrough.

4. A fishing hook adapted to be attached to a fishing line having a knotted end comprising a stem portion having an eye at its upper end and a double reverse bend adjacent but below said eye, the opening in the first reverse bend facing toward said eye and the opening in the second reverse bend facing away from said eye and being nearly closed at its lower end, the segments of said stem portion forming the opening in the last-named reverse bend converging together toward said lower end to form a restricted passageway therebetween tending to prevent passage of said fishing line therethrough, said second reverse bend having a smaller radius than the radius of said eye so that the knotted end of a fishing line can be passed through said eye in one direction and passed back under said second bend in the opposite direction and drawn thereinto and by virtue of the smaller radius of said second reverse bend the knotted portion cannot be pulled therethrough.

References Cited in the file of this patent

UNITED STATES PATENTS

| | | |
|---|---|---|
| 545,043 | Attwood et al. | Aug. 27, 1895 |
| 732,081 | Jacobson et al. | June 30, 1903 |
| 1,156,152 | Krenrick | Oct. 12, 1915 |
| 1,263,491 | Ward | Apr. 23, 1918 |
| 2,750,704 | Bemis | June 19, 1953 |